US012753325B2

(12) United States Patent
Ho et al.

(10) Patent No.: US 12,753,325 B2
(45) Date of Patent: Oct. 6, 2026

(54) RELEASE COATING COMPOSITIONS AND ARTICLES THEREFROM

(71) Applicant: 3M INNOVATIVE PROPERTIES COMPANY, St. Paul, MN (US)

(72) Inventors: Victor Ho, St. Paul, MN (US); Karl E. Benson, St. Paul, MN (US); Kevin T. Huseby, Oakdale, MN (US); Stephen A. Johnson, Woodbury, MN (US); Anna Clausen, Minneapolis, MN (US); Jeffrey A. Peterson, Hugo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 794 days.

(21) Appl. No.: 17/289,329

(22) PCT Filed: Dec. 19, 2019

(86) PCT No.: PCT/IB2019/061127

§ 371 (c)(1),
(2) Date: Apr. 28, 2021

(87) PCT Pub. No.: WO2020/128969

PCT Pub. Date: Jun. 25, 2020

(65) Prior Publication Data

US 2022/0010171 A1 Jan. 13, 2022

Related U.S. Application Data

(60) Provisional application No. 62/783,755, filed on Dec. 21, 2018.

(51) Int. Cl.

| | |
|---|---|
| ***C09D 183/10*** | (2006.01) |
| ***C08G 63/183*** | (2006.01) |
| ***C08G 63/688*** | (2006.01) |
| ***C08G 77/16*** | (2006.01) |
| ***C08G 77/445*** | (2006.01) |
| ***C08K 5/3492*** | (2006.01) |
| ***C08K 5/42*** | (2006.01) |

(52) U.S. Cl.
CPC ......... *C09D 183/10* (2013.01); *C08G 63/183* (2013.01); *C08G 63/6886* (2013.01); *C08G 77/16* (2013.01); *C08G 77/445* (2013.01); *C08K 5/34922* (2013.01); *C08K 5/42* (2013.01)

(58) Field of Classification Search
CPC ....... C09D 183/10; C08L 83/04; C08L 67/02; C08L 83/10; C08L 33/00; C08G 77/28; C08G 77/14; C08G 77/392; C08G 77/445
See application file for complete search history.

(56) References Cited

U.S. PATENT DOCUMENTS

| | | | | |
|---|---|---|---|---|
| 4,098,952 | A | 7/1978 | Kelly | |
| 4,287,109 | A | 9/1981 | Schlak | |
| 4,321,170 | A | 3/1982 | Zabrocki | |
| 4,454,266 | A * | 6/1984 | Coughlan | B29C 33/64 264/300 |
| 4,973,656 | A | 11/1990 | Blount | |
| 5,077,353 | A | 12/1991 | Culbertson | |
| 5,212,012 | A | 5/1993 | Culbertson | |
| 5,262,492 | A * | 11/1993 | Hanada | C08G 18/61 528/26 |
| 5,298,325 | A | 3/1994 | Culbertson | |
| 5,302,459 | A | 4/1994 | Kim | |
| 5,350,601 | A | 9/1994 | Culbertson | |
| 5,427,835 | A | 6/1995 | Morrison | |
| 5,500,547 | A | 3/1996 | Yamaguchi | |
| 6,020,412 | A | 2/2000 | Muschelewicz | |
| 6,030,630 | A | 2/2000 | Fleury | |
| 6,251,413 | B1 | 6/2001 | Ferrari | |
| 6,664,015 | B1 | 12/2003 | Sacripante | |
| 6,818,723 | B2 | 11/2004 | Sacripante | |
| 6,893,731 | B2 | 5/2005 | Kausch | |
| 9,035,008 | B2 | 5/2015 | Yang | |
| 9,504,748 | B2 | 11/2016 | Cauvin | |
| 2003/0236379 | A1 * | 12/2003 | Sacripante | C08G 77/445 528/10 |
| 2004/0034131 | A1 | 2/2004 | Chowdhury | |

(Continued)

FOREIGN PATENT DOCUMENTS

| | | | |
|---|---|---|---|
| CN | 104080838 | A | 10/2014 |
| DE | 2835443 | | 2/1980 |
| EP | 0430828 | | 6/1991 |
| EP | 0502022 | | 9/1992 |
| JP | 3638178 | | 4/2005 |
| JP | 3638178 | B2 * | 4/2005 |
| JP | 2013071274 | A * | 4/2013 |

(Continued)

OTHER PUBLICATIONS

English machine translation JP3638178B2 (2005).*

(Continued)

*Primary Examiner* — Callie E Shosho
*Assistant Examiner* — Krupa Shukla
(74) *Attorney, Agent, or Firm* — Julie Lapos-Kuchar

(57) ABSTRACT

Described herein is a release coating composition, articles made with the release coating composition and methods of making a release liner. The release coating composition comprising: (i) a sulfonated polyester siloxane polymer derived from: (a) at least one organic diol monomer, (b) at least one organic diacid monomer, at least one diester monomer or mixtures thereof; (c) at least one carbinol terminated polydimethylsiloxane, at least one carboxy terminated polydimethylsiloxane or mixtures thereof; and (d) at least one ion salt on a sulfonate difunctional monomer; (ii) a water-soluble or water-dispersible second polymer; and (iii) a thermally activated curing system, comprising a multifunctional compound.

20 Claims, No Drawings

(56) References Cited

U.S. PATENT DOCUMENTS

| | | | | |
|---|---|---|---|---|
| 2005/0123689 | A1 | 6/2005 | Branlard | |
| 2011/0021723 | A1* | 1/2011 | Yanagisawa | C08G 77/08 525/477 |
| 2015/0175821 | A1* | 6/2015 | Moorlag | C09D 11/104 524/588 |

FOREIGN PATENT DOCUMENTS

| | | | |
|---|---|---|---|
| WO | WO 1991-07456 | 5/1991 | |
| WO | WO-0125360 A1 * | 4/2001 | C09D 183/04 |

OTHER PUBLICATIONS

Polysiloxane Surfactants article by Yan Jio (2009).*

Machine translation of JP-2013071274-A, retrieved Jan. 10, 2025. (Year: 2013).*

Werner et al. "Polyesters, Films," The Encyclopedia of Polymer Science and Engineering, vol. 12, 2nd edition, pp. 193 to 216, 1987.

International Search Report for PCT International Application No. PCT/IB2019/061127, mailed on Mar. 26, 2020, 4 pages.

* cited by examiner

RELEASE COATING COMPOSITIONS AND ARTICLES THEREFROM

TECHNICAL FIELD

A release coating composition is described along with articles coated with the release coating and methods of making such articles.

SUMMARY

Release liners arm films or papers used for the release from adhesives, adhesive laminate constructions, or mastics in industrial operations. The term release liner is also used for films and papers that are used to cover and subsequently release from various objects, materials or parts, such as in molding operations or when handing certain types of materials.

For liners that are to be used in adhesive constructions, the release liner industry commonly uses silicone release coatings applied over polymeric film substrates to generate liner stock. Polyethylene terephthalate, polyethylene and polypropylene are common polymer film substrates for these liners, preferred grades of which are commonly known in the art.

A problem often encountered in the polymer film art relates to the difficulty of providing strong adhesion between substrates and functional coatings applied to them. This is particularly so in the case of polyester-based substrates. To deal with the problem, a primer layer or coating is generally applied to the polyester substrate to improve adhesion between the substrate and an overcoat applied to the substrate.

Thus, there is a desire to identify a silicone-containing release liner which has fewer processing step (e.g. no primer layer) and wherein the release layer is sufficiently adhered to the substrate. In one embodiment, there is no silicone migration in the release liner. In another embodiment, the substrate, either before or after coating with the release coating, is drawn in the transverse and/or machine direction.

In one aspect, release coating composition is disclosed, the release coating composition comprising:

(i) a sulfonated polyester siloxane polymer derived from:

a. at least one organic diol monomer;

b. at least one organic diacid monomer, at least one diester monomer or mixtures thereof;

c. at least one carbinol terminated polydimethylsiloxane, at least one carboxy terminated polydimethylsiloxane or mixtures thereof; and d. at least one ion salt on a sulfonate difunctional monomer;

(ii) a water-soluble or water-dispersible second polymer; and (iii) a thermally activated curing system comprising a multifunctional compound.

In one embodiment, a coated substrate is disclosed, the coated substrate comprising: a coating layer disposed on a polyester substrate, wherein the coating layer is a cured product of the release coating composition disclosed above.

In another embodiment, a method of making a release coated article is disclosed, the method comprising:

coating a substrate with the coating composition described above to form a coated article, drawing the substrate in at least one of the transverse or machine direction, and optionally, heat setting the coated article to activate the curing system.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B);

"crosslinking" refers to connecting two pre-formed polymer chains using chemical bonds or chemical groups; and "monomer" is a molecule which can undergo polymerization which then form part of the essential structure of a polymer.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

As used herein, "comprises at least one of" A, B, and C refers to element A by itself, element B by itself, element C by itself, A and B, A and C, B and C, and a combination of all three.

In the present disclosure, it has been discovered that the sulfonated polyester siloxane polymer disclosed herein can be disposed on a polymeric substrate to provide, for example, a release liner, wherein the sulfonated polyester siloxane polymer has sufficient adhesion to the substrate. In one embodiment, the sulfonated polyester siloxane polymer can be directly disposed onto the polymeric substrate without additional layers therebetween, such as a primer layer. In one embodiment, there is minimal migration of silicone. In one embodiment, the coating composition comprising the sulfonated polyester siloxane polymer is disposed on a polymeric substrate, such as a film. The polymeric film can be stretched in the longitudinal and/or transverse direction.

Sulfonated Polyester Siloxane Polymer

The sulfonated polyester siloxane polymer disclosed herein is generated from the reaction of (i) at least one organic diol monomer, (ii) at least one organic diacid monomer and/or at least one diester monomer, (iii) at least one carbinol terminated polydimethylsiloxane and/or at least one carboxy terminated polydimethylsiloxane, and (iv) at least one ion salt of a sulfonate difunctional monomer.

In one embodiment, the organic diol is ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, 1,2-hexylene glycol, 1,3-hexylene glycol, 1,4-hexylene glycol, 1,5-hexylene glycol, 1,6-hexylene glycol, heptylene glycols, octylene glycols, decylene glycol, dodecylene glycol, 2,2-dimethyl propanediol, propoxylated bisphenol A, ethoxylated bisphenol A, 1,4-cyclohexane diol, 1,3-cyclohexane diol, 1,2-cyclohexane diol, 1,4-cyclohexane dimethanol, neopentyl glycol, or mixtures thereof. In one embodiment, the sulfonated polyester siloxane polymer is derived from at least 45, or even 49 mole percent and at most 51, 53, or even 55 mole percent of the organic diol.

In one embodiment, the organic diacid monomer and diester monomer are selected from malonic acid, succinic acid, 2-methylsuccinic acid, 2,3-dimethylsuccinic acid, dodecylsuccinic acid, glutaric acid, adipic acid, 2-methyladipic acid, pimelic acid, azelaic acid, sebacic acid, tereplithalic acid, dimethyl terephthalate, isophthalic acid, phthalic acid, 1,2-cyclohexanedioic acid, 1,3-cyclohexanedioic acid, 1,4-cyclohexanedioic acid, glutaric anhydride, succinic anhydride, dodecylsuccinic anhydride, maleic anhydride, fumaric acid, maleic acid, itaconic acid, 2-methyl itaconic acid, dialkyl esters such as the methyl, ethyl, propyl, butyl, pentyl, hexyl, heptyl, or octyl esters of above mentioned acids, and mixtures thereof. In one embodiment, the alkyl groups of the dialkyl ester possess 1, 2, 3, 4, or 5 carbon atoms. In one embodiment, the sulfonated polyester siloxane polymer is derived from at least 5, 10, or even 20 mole percent and at most 40, 45, 51, 53, or even 55 mole percent of the organic diacid monomer and diester monomers versus the total moles of monomer in the sulfonated polyester siloxane polymer.

In one embodiment, the carbinol terminated polydimethylsiloxane or carboxy terminated polydimethylsiloxane is selected from bis-(1,3-hydroxypropyl)-polydimethylsiloxane, bis-(1,3-hydroxyethyl)-polydimethylsiloxane, bis-(1,3-hydroxybutyl)-polydimethylsiloxane, a carboxyl terminated polydimethyl siloxane, such as bis-(1,3-carboxypropyl)-polydimethylsiloxane, bis-(1,3-carboxyethyl)-polydimethylsiloxane, and mixtures thereof. In one embodiment, the sulfonated polyester siloxane polymer is derived from at least 5, 10, or even 15 and at most 20, 25, or even 30 weight percent of the carbinol terminated polydimethylsiloxane and the carboxy terminated polydimethylsiloxane based on the total weight of the sulfonated polyester siloxane polymer.

Exemplary carbinol terminated polydimethylsiloxane and carboxy terminated polydimethylsiloxane include bis-(1,3-hydroxypropyl)-polydimethylsiloxane, bis-(1,3-hydroxyethyl)-polydimethylsiloxane, and bis-(1,3-hydroxybutyl)-polydimethylsiloxane, or carboxyl terminated polydimethylsiloxane, such as bis-(1,3-carboxypropyl)-polydimethylsiloxane, and bis-(1,3-carboxyethyl)-polydimethylsiloxane.

In one embodiment, the ion salt of the sulfonate difunctional monomer is (i) an ion selected from hydrogen; an alkali or alkaline earth metal such lithium, sodium, potassium, cesium, rubidium, magnesium, barium, calcium, beryllium); a transition metal such as zinc, zirconium, vanadium, copper, and aluminum; and combinations thereof; and (ii) a sulfonated difunctional moiety selected from dimethyl-5-sulfo-isophthalate, dialkyl-5-sulfo-isophthalate-4-sulfo-1,8-naphthalic anhydride, 4-sulfo-phthalic acid, 4-sulfophenyl-3,5-dicarbornethoxybenzene, 6-sulfo-2-naphthyl-3,5-dicarbornethoxybenzene, sulfo-terephthalic acid, dimethyl-sulfo-terephthalate, dialkyl-sulfo-terephthalate, sulfo-ethanediol, 2-sulfo-propanediol, 2-sulfo-butanediol, 3-sulfo-pentanediol, 2-sulfo-hexanediol, 3-sulfo-2-methylpentanediol, N,N-bis(2-hydroxyethyl)-2-aminoethane sulfonate, 2-sulfo-3,3-dimethylpentanediol, sulfo-p-hydroxybenzoic acid, and mixtures thereof. In one embodiment, the ion salt of the sulfonate difunctional monomer is at least 0.1, 0.5, 1, or even 2 wt % and at most 3, 4, or even 5 w % eight percent based on the weight of the sulfonated polyester siloxane polymer.

In one embodiment, the sulfonated polyester siloxane polymer, such as copoly(1,2-propylene-5-sulfoisophthalate sodio salt)-copoly(1,2-propylene terephthalate-co-diethylene terephthalate)-copoly-dimethylsiloxane, can be prepared by charging a 1 liter Parr reactor equipped with a mechanical stirrer and side condenser with a mixture of from about 0.10 mole to about 0.2 of a carbinol terminated polydimethylsiloxane; from about 0.8 to about 0.95 mole of diester, such as dimethylterephthalate; from about 0.05 to about 0.05 mole of sulfonate monomer, such as dimethyl 5-sulfo-isophthalate sodium salt; from about 1.5 moles to about 1.95 moles of a diol, such as 1,2-propanediol or diethylene glycol or a mixture of the diols, and containing from about 0.15 to about 0.3 mole of diethylene glycol, and from about 0.01 to about 0.001 mole of a condensation catalyst, such as butyltin oxide hydroxide. The reactor is subsequently heated, for example, to 170° C. for a suitable duration of, for example, from about 360 minutes to about 720 minutes with stirring at, for example, from about 10 revolutions per minute to about 200 revolutions per minute. During this time, from about 1.7 moles to about 1.9 moles of methanol byproduct can be collected through the condenser. The reactor temperature is then increased to about 220° C. and the pressure is reduced from 760 Torr to about 1 Torr over a period of from about 2 hours to about 3 hours. The polymeric resin product comprised of copoly(1,2-propylene-5-sulfoisophthalate sodium salt)-poly(1,2-propylene terephthalate-co-diethylene terephthalate)-copolydimethylsiloxane, can then be discharged through the bottom of the reactor and cooled to room temperature, about 22° C. to about 25° C. and isolated and/or purified using techniques known in the art.

Examples of polycondensation catalysts which can be used in the preparation of the sulfonated polyester siloxane polymer include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof. In one embodiment, the polycondensation catalysts are selected in effective amounts of from, for example, at least 0.01, 0.5, or even 0.75 mole % and at most 2, 3, 4, or even 5 mole percent based on the starting diacid and/or diester used to generate the sulfonated polyester siloxane polymer.

In one embodiment, the sulfonated polyester siloxane polymer is represented by the following randomly chemically attached segments

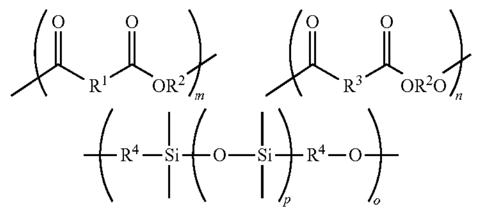

wherein the segments in, n and o represent the random units of the polymer, and wherein p represents the repeating segment of the polydimethylsiloxane. $R^1$ is an arylene or an alkylene. $R^2$ is an arylene or an alkylene. $R^3$ is an alkali arylene sulfonate or an alkali alkylene-sulfonate, and $R^4$ is an alkylene.

In one embodiment, the sum of m, n, and o is at least 10, 20, 30, 40 or even 50; and at most 100, 200, 500, 1000, 5000, 8000, or even 10000. In another embodiment, the sum of m, n, and o is at least 500, or even 1000; and at most 2000, 2500, 3000, 3500, or even 4000.

In one embodiment, p represents the repeating segment of the polydimethylsiloxane and is from at least 10, 25, 50, or even 75, and at most 100, 125, or even 150 units.

In one embodiment, the arylene group, $R^1$, is phenylene or naphthylene. In one embodiment, the alkylene group, $R^1$ comprises at least 1, 2, 3, 4, or even 6 carbon atoms; and at most 10, 12, 14, 16, or even 18 carbon atoms.

In one embodiment, the $R^2$ comprises at least 2, 4, 6, or even 8 carbon atoms and at most 20, 25, 30, or even 36 carbon atoms. In one embodiment R ethylene.

In one embodiment, the alkali arylene sulfonate ($R^3$) is selected from phenylenesulfonate, isophthalylene-5-sulfonate, terephthalylene-sulfonate, phthalylene-sulfonate, or an alkali alkylene-sulfonate of propylene-sulfonate, butylenes-sulfonate, pentylene-sulfonate, or hexylene-sulfonate. Exemplary $R^3$ groups include those of the formulas

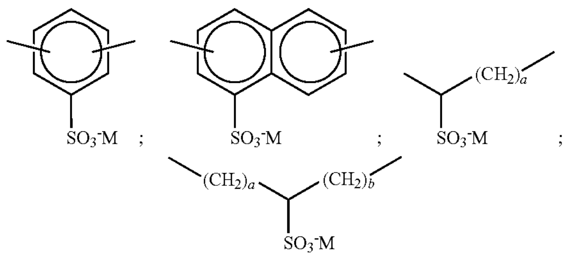

wherein M is hydrogen, an alkali or alkaline earth metal (such as lithium, sodium, potassium, rubidium, cesium, beryllium, magnesium, calcium, strontium, barium, etc.), zinc (II), iron (III), aluminum (III), copper (I), and mixtures thereof.

In one embodiment, alkylene group, $R^4$, comprises from at least 1, 2, 3, 4, or even 6 carbon atoms; and at most 10, 12, 14, 16, or even 18 carbon atoms, including for example, ethylene, propylene, butylene, or combinations thereof.

In one embodiment, the sulfonated polyester siloxane polymer is poly(ethylene terephthalate)-co-(1,4-cyclohexane dimethylene terephthalate)-co-(ethylene isophthalate)-co-(1,4-cyclohexane dimethylene isophthalate)-co-(ethylene 5-sulfoisophthalate)-co-(1,4-cyclohexane dimethylene 5-sulfoisophthalate)-co-(polydimethylsiloxane propylene terephthalate)-co-(polydimethylsiloxane propylene isophthalate)-co-(polydimethylsiloxane propylene 5-sulfoisophthalate), or poly(ethylene sebacate)-co-(2,2-dimethylpropylene sebacate)-co-(ethylene isophthalate)-co-(2,2-dimethylpropylene isophthalate)-co-(ethylene 5-sulfoisophthalate)-co-(2,2-dimethylpropylene 5-sulfoisophthalate)-co-(polydimethylsiloxane propylene sebacate)-co-(polydimethylsiloxane propylene isophthalate)-co-(polydimethylsiloxane propylene 5-sulfoisophthalate).

In one embodiment, the sulfonated polyester siloxane polymer can be characterized by gel permeation chromatography. In one embodiment, the sulfonated polyester siloxane polymer has a weight average molecular w eight of at least 2,000, 2,500, 4,000, or even 5,000 g/mol and at most 25,000, 50,000, 100,000, or even 150,000 g/mol. In one embodiment, the sulfonated polyester siloxane polymer has a polydispersity of at least 2, 4, 6, 8, or even 10 and at most 50, 60, 70, 80, 90, or even 100 In another embodiment, the sulfonated polyester siloxane polymer has a polydispersity of at least 1.8, or even 2 and at most 10, 15, 17, 20, 25, or even 30.

In one embodiment, the sulfonated polyester siloxane polymer has a softening point of from about 20° C. to about 150° C. The sulfonated polyester siloxane polymer can be prepared from a suitable selection of monomers, which result in the polyester portion of the sulfonated polyester siloxane polymer that displays, for example, a glass transition temperature of at least 10, 15, 20, or even 25° C. and at most 70, 80, 90, or even 100° C., and wherein the polydimethylsiloxane portion of the sulfonated polyester siloxane polymer displays a glass transition temperature of at least –78, –75, –70, –65, or even –60° C. and at most –40, –35, –0, –25, or even –20° C. with respect to the sulfonated polyester siloxane polymer. In one embodiment, the sulfonated polyester siloxane polymer disperses, dissipates or emulsifies in water at a temperature of from about 20° C. to about 100° C. to thereby provide a waterborne emulsion. In one embodiment, the sulfonated polyester siloxane polymer exists as a waterborne emulsion with a solids content of at least 1, 2, 5, 10, or even 15 wt %, and at most 20, 25, 30, or even 35 wt % in the emulsion with the remainder being water. In one embodiment, the sulfonated polyester siloxane polymer exists as a waterborne emulsion and wherein the average polymer particle size diameter is at least 1, 2, 4, 10, 25, 50 or even 100 nanometer and at most 1, 2, 5, 10, 25, 50, 75, or even 100 microns in size.

Second Polymer

The coating composition disclosed herein also includes a second polymer, which is water-soluble or water-dispersible and is added to the coating composition to help with the formation of a uniform film. In one embodiment, this second polymer has a glass transition temperature, which is less than 60, 50, 40, 30, 25, 23, 20, 15, 10, 5, or even 0° C. and greater than –60° C. The glass transition temperature can be obtained using techniques known in the art such as using dynamic mechanical analysis or differential scanning calorimetry.

Without wishing to be bound by any theory, it is believed that the second, water-soluble or water-dispersible polymer serves to “fill in” spaces between the particles of the sulfonated polyester siloxane polymer making for a smoother, more continuous coating, which in turn helps to contribute to the adhesion.

Useful water-soluble or water-dispersible second polymers include, but are not limited to, acrylate-based resins, sulfonated polyester-based resins, and mixtures thereof. Such polymers include polyester sulfonate and acrylate-based resins including, but are not limited to, polyacrylic acid, polymethacrylic acids, and their salts, acrylic emulsion resins and acrylic-styrene copolymer emulsion resins. Preferably, the acrylic polymer and copolymer emulsion is water-based. Illustrative examples of commercially available water-based acrylic emulsions include, but are not limited to, materials available under the trade designations “MAINCOTE HG54D” and “MAINCOTE PR-71”, both available from Dow DuPont, formerly as Rohm and Haas Co., Philadelphia, Pa.. USA. An illustrative example of a commercially available water-based acrylic-styrene copolymer emulsion available under the trade designation “RHOPLEX WL-96”, also available from Rohm and Haas Co. A preferred acrylate-based resin is described in Example 3 of U.S. Pat. No. 4,098,952 (Kelly et al.), herein incorporated by reference. Useful sulfonated polyester-based resins include, but are not limited to, ones taught in. e.g., U.S. Pat. No. 5,427,835 (Morrison et al.), herein incorporated by reference.

In one embodiment, the second polymer is preferably present in an amount of at least 2, 4, 6, 8, 10, or even 12 percent and at most 25, 50, 70, 90, or even 95 percent by weight versus the amount of the sulfonated polyester siloxane polymer. Because the coating composition is water-based, typically, there is less than 100 percent solids, typically there is less than about 75 percent solids.

The water-soluble or water-dispersible second polymer is selected so as to produce a layer exhibiting good adhesion to the substrate. By "good adhesion," it is meant generally that adhesion between the substrate, and release layer preferably exhibits a rating of 4 to 5 according to ASTM 3359-95a, Test Method B.

Curing System

A curing system is used to adjust to molecular weight and/or make the coated article more durable. The curing system is thermally activated and comprises a multifunctional compound. The multifunctional compound comprises at least two functional groups. The at least two functional groups may be the same functional groups or they may be different functional groups. Exemplary multifunctional compounds can include: epoxy, alkyd resins and/or condensation products of an amine, e.g melamine, diazine, polyaziridines, urea, cyclic ethylene urea, cyclic propylene urea, thiourea, cyclic ethylene thiourea, alkyl melamines, aryl melamines, e.g., such as a butylated melamine, polyisocyanates, polyimides, benzo guanamines, guanamines, alkyl guanamines and aryl guanamines with an aldehyde. e.g. formaldehyde, aziridines.

Illustrative examples of commercially available multifunctional compounds include, but are not limited to, those available under the trade designations "CYMEL 323" and "CYMEL 373", both of which are methylated melamine formaldehyde resin, available from CYTEC Company, West Paterson, N.J., USA.

In one embodiment, the multifunctional compound can be thermally activated by heat. Such thermally activated multifunctional compounds include: isocyanates, blocked isocyanates, epoxies, and aziridines.

In another embodiment, the composition comprises a multifunctional compound and a thermally activated catalyst, wherein the catalyst, which is a thermally labile compound, becomes active above a certain temperature. In one embodiment, such multifunctional compounds are called acid-catalyzed. Exemplary acid catalyzed multifunctional compounds include: epoxies and condensation products of amines.

A catalyst, such as latent catalyst, which is activated via heat may be used to accelerate crosslinking of the coating composition. Suitable catalysts for a melamine multifunctional compound include ammonium chloride, ammonium nitrate, ammonium thiocyanate, ammonium dihydrogen phosphate, ammonium sulfate, diammonium hydrogen phosphate, maleic acid stabilized by reaction with a base, ethylene acrylic acid and para toluene sulfonate, such as morpholinium para toluene sulfonate. If used, the amount of catalyst depends on the amount of multifunctional compound used. When the multifunctional compound is present in an amount of about 0.1 to 2 percent solids by weight, the amount of catalyst present is preferably in an amount of about 0.005 to 1 percent solids by weight.

Although not wanting to be limited by theory, it is believed that in one embodiment, the multifunctional compound crosslink with functional groups, primarily hydroxyl groups present in the sulfonated polyester siloxane polymer in the coating composition. In one embodiment, the multifunctional compound is able to internally crosslink. In one embodiment, the curing system comprises an acid catalyzed multifunctional compound or a thermally activated multifunctional compound.

In one embodiment, the multifunctional compound is present in an amount of at least 0.1, 0.5, 1, or even 2% solids and at most 5, 10, 15, or even 20% solids by weight, versus the sulfonated polyester siloxane polymer.

The coating composition exists initially in aqueous form, wherein all its components are either dissolved or dispersed in water. Once the composition is coated or applied to a substrate (such as a polyester-based film), dried and cured, the composition becomes a "release layer"

Additional Components

In addition to the sulfonated polyester siloxane polymer, the second polymer and the thermally activated curing system, in one embodiment, additional components are added to the coating composition.

For example, surfactants or wetting agents are used in the coating composition to adjust the surface tension of the composition so as to improve its ability to be coated to a substrate. Exemplary surfactants have an HLB (Hydrophilic-Lipophilic Balance) value of about 7 to 10. The HLB value describes the balance of the size and strength of the hydrophilic (water-loving or polar) groups to the lipophilic (oil-loving or non-polar) groups of the surfactant. An illustrative example of a commercially available surfactant is "TRITON X-100", which is octylphenoxy polyethoxy ethanol having an HLB of about 7, commercially available from Union Carbide Chemical Company, Danbury, Conn., USA.

There are several optional components that can be added to the coating composition to aid processing or film handling, once the coating is applied to a substrate.

In one embodiment, a slip agent is added to the coating composition. Slip agents, which are typically small particles, can be used to improve the handling characteristic of the coated substrate. In particular, slip agents can aid in the winding-up of a substrate having the composition disclosed herein applied to it. A preferred slip agent is polymeric particles, such as polystyrene beads having diameters in the sub-micron ($10^{-6}$ meters) to a few micrometers. If used, the amount of slip agent is preferably at least 0.0001, 0.001, 0.01, or even 0.1% by weight and at most 1, 2, 5, 8, or even 10 percent weight based on the weight of solids in the coating composition.

In one embodiment, an additive is added to the coating composition. The additives can include, for example, antistatic agents, colorants, ultraviolet light stabilizers, hindered amine light stabilizers, and combinations thereof. When used, the additives are preferably present in an amount of not more than about 10 percent solids by weight. Useful antistatic agents are disclosed in U.S. Pat. No. 5,500,547 (Sarkar et al.) in column 10, lines 4 to 53.

Useful hindered amine light stabilizers include, but are not limited to, the following: (1) Bis-(2,2,6,6-tetramethyl-4-piperidinyl)sebacate, available from Ciba-Geigy Corp., Hawthorne, N.Y. under the trade designation "TINUVIN 770", (2) Bis-(1,2,2,6,6-pentamethyl-4-peperidinyl)-2-n-butyl-2-(3,5-di-tert-butyl-4-hydroxybenzyl)malonate, available from Ciba-Geigy Corp. under the trade designation "TINUVIN 144"; (3) propanedioic acid, [(4-methoxyphenyl)-methylene]-bis-(1,2,2,6,6-pentamethyl-4-piperidinyl) ester, available from Clariant Corp, Charlotte, N.C. under product number PR-31; (4) dimethyl succinate polymer with 4-hydroxy-2,2,6,6-tetramethyl-1-piperidine ethanol, available from Ciba-Geigy Corp. under the trade designation "TINUVIN 622", (5) poly [6-[(1,1,3,3-tetramethylbutyl) amino]-s-triazine-2,4-diyl][2,2,6,6-tetramethyl-4-piperidyl) imino]hexamethylene[(2,2,6,6-tetramethyl-4-piperidyl) imino], available from Ciba-Geigy as under the trade designation "CHIMASORB 944FL"; and (6) low molecular weight (about 435 grams/mole) acetylated hindered amine light stabilizer, available from Ciba-Geigy Corp. under the trade designation "TINUVIN 440".

Preparation of Articles

The coating composition can be formulated in a batch type reactor or vessel by mixing the components together using conventional mixing apparatus and known techniques. The coating composition may be applied to the surfaces of a substrate by any suitable known film coating techniques including, but not limited to, notch bar coating, knife coating, and gravure coating Once coated on a substrate, the coated film should be dried and/or cured, preferably by heating to a temperature exceeding 70° C. and up to a maximum temperature determined by the nature of the film used. The coated substrate may be partially dried and/or cured. In one embodiment, an additional coating or layer (such as an adhesive) is applied to the release coated substrate.

In one embodiment, the release coating composition is disposed directly onto the surface of the substrate. The coating composition has been formulated to provide good adhesion to a polyester-based substrate. Illustrative examples of useful polyester-based substrates include, unoriented, uniaxially oriented, and biaxially oriented polyesters, such as, for example, polylactic acid, polyethylene terephthalate (PET), polybutylene terephthalate (PBT), polyethylene napthalate (PEN), polybutylene naphthalate (PBN), and copolymers thereof, and PETG and PCTG amorphous copolymers of polyethylene terephthalate available from Eastman Chemical Co., Kingsport, Ind.), and blends thereof. Polyesters include carboxylate and glycol subunits and can be generated by, for example, (a) reaction of carboxylate monomer molecules with glycol monomer molecules or (b) transesterification. Each carboxylate monomer molecule has two or more carboxylic acid or ester functional groups and each glycol monomer molecule has two or more hydroxy functional groups. Polyesters can be formed using a single type of carboxylate monomer molecule or two or more different types of carboxylate monomer molecules. The same applies to the glycol monomer molecules. Also included within the term "polyester" are polycarbonates, which are derived from the reaction of glycol monomer molecules with esters of carbonic acid.

In one embodiment, the composition is coated onto the substrate of at least 0.0076, 0.01, or even 0.015 mm and at most 0.020, 0.025, 0.030, 0.040, 0.050, 0.060, 0.070, or even 0.076 mm wet coating thickness. Preferably, the final dry thickness of the coating layer is at least 10, 25, or even 50 nm and at most 100, 500, or even 1000 nm.

When the substrate is an oriented polyester-based film, the coating composition can be applied before, during, or after the orientation process. As used herein, "oriented" generally means uniaxial or biaxial drawing of the polyester-based film to impart certain desirable characteristics to the film. The process of orienting film, particularly polyester films, is described in Volume 12 of *The Encyclopedia of Polymer Science and Engineering,* 2nd edition, pages 193 to 216. A typical process for fabricating biaxially oriented polyester films contains four main steps: (1) melt extrusion of the polyester resin and quenching it to form a web, (2) drawing the web in the longitudinal or machine direction, (3) subsequently or simultaneously drawing the web in the transverse direction to create a film, and (4) heat setting the film.

In one embodiment, the coating composition is applied to the polyester substrate after it has been drawn in the machine direction but before it has been subsequently drawn in the transverse direction. After coating, the coated article may, or may not, be drawn in the transverse direction. When the coating composition is applied to a previously oriented polyester substrate, it is preferred that the surface of the substrate be pre-treated with a corona discharge, such as, air corona or nitrogen corona treatment. Preferably, the corona treatment is in the range of about 0.2 millijoules per square centimeter ($mJ/cm^2$) of film surface area. Higher corona treatment levels can be used if desired.

In another embodiment, the coating composition is applied to the polyester-based substrate before being drawn, and may be drawn in the machine and/or transverse direction after coating.

Drawing of the article (either the polyester substrate or the coated polyester substrate), can be done by stretching the article at ratios determined by the desired optical and mechanical properties. Longitudinal (or machine) stretching can be done by pull rolls. Transverse stretching can be done in a tenter oven. If desired, the article can be bi-axially stretched simultaneously. Stretch ratios of approximately 3 to 1 or 4 to 1 are preferred, although ratios as small as 2 to 1 and as large as 9 to 1 may also be appropriate.

As used herein, the term heat setting refers to a heating protocol in which the coated article (oriented or unoriented) is heated following orientation. The heating may be used to activate curing of the coating composition, and/or enhance film properties such as, for example, crystal growth, dimensional stability, and/or overall optical performance. The heat setting is a function of both temperature and time, and factors must be considered such as, for example, commercially useful line speed and heat transfer properties of the film, as well as the optical clarity of the final product. In an exemplary embodiment, the heat setting process involves heating the coated article to above the glass transition temperature (Tg) of at least one polymeric component thereof, and preferably above the Tg of all polymeric components thereof. In one embodiment of the heat setting process, the coated article is heated above the stretch temperature of the article, although this is not required. In another embodiment, in the heat setting process the coated article is heated to a temperature between the Tg and the melting point of the substrate. The heat setting step can also activate the curing system (e.g., the thermally activated multifunctional compound or the latent catalyst).

In one embodiment, the release liner, comprising the release coating disposed on the first major surface of the substrate, further comprises a second layer disposed on the major surface of the release coating layer, opposite the substrate.

In one embodiment, the release liner, comprising the release coating disposed on the first major surface of the substrate, further comprises a third layer disposed on the second major surface of the substrate, opposite the coating layer. Such a layer can include polypropylene.

Surprisingly, it has been discovered that the release coating compositions disclosed herein can be coated directly onto a substrate, without the need for a primer layer and still have good adhesion between the release layer and the underlying substrate. In one embodiment, at least a portion of the coating layer interpenetrates the underlying substrate.

In one embodiment, the release layer has good adhesion to the substrate. In one embodiment, the release liner can be reused, indicating that at least a portion of the release coating remains adhered to the substrate.

Exemplary embodiments include, but are not limited to, the following:

Embodiment one. A release coating composition comprising:

(i) a sulfonated polyester siloxane polymer derived from:

(a) at least one organic diol monomer;

(b) at least one organic diacid monomer, at least one diester monomer or mixtures thereof;

(c) at least one carbinol terminated polydimethylsiloxane, at least one carboxy terminated polydimethylsiloxane, or mixtures thereof; and (d) at least one ion salt on a sulfonate difunctional monomer;

(ii) a water-soluble or water-dispersible second polymer; and (iii) a thermally activated curing system, comprising a multifunctional compound.

Embodiment two. The release coating composition of claim one, wherein the sulfonated polyester siloxane polymer is represented by the following randomly chemically attached segments:

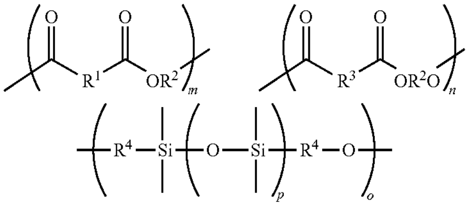

wherein the segments in, n and o represent the random units of the sulfonated polyester siloxane polymer, and wherein the sum of m, n, and o is from about 10 to about 500; p represents the repeating segment of the polydimethylsiloxane and is from about 20 to about 150 units; $R^1$ is an arylene; $R^2$ is an alkylene; $R^3$ is an alkali arylene sulfonate or an alkali alkylene-sulfonate, and $R^4$ is an alkylene.

Embodiment three. The release coating composition of embodiment two, wherein $R^1$ contains from about 1 to about 18 carbon atoms; and $R^2$ contains a carbon chain length of from 2 to 36 carbon atoms.

Embodiment four. The release coating composition of any one of the previous embodiments, wherein the ion salt of the sulfonate difunctional monomer comprises hydrogen, sodium, potassium, cesium, or rubidium salt of dimethyl-5-sulfo-isophthalate, 4-sulfo-phthalic acid, sulfo-terephthalic acid, dimethyl-sulfo-terephthalate, dialkyl-sulfo-terephthalate or combinations thereof.

Embodiment five. The release coating composition of any one of embodiments two-four, wherein $R^3$ is an alkali arylenesulfonate of the formulas

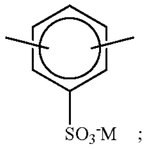 ; 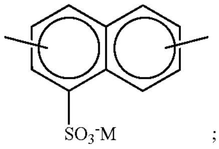 ;

wherein M is selected from at least one of hydrogen, lithium, sodium, potassium, rubidium, or cesium.

Embodiment six. The release coating composition of any one of the previous embodiments, wherein the organic diol is ethylene glycol, 1,6-hexylene glycol, 1,4-cyclohexane dimethanol, neopentyl glycol, or mixtures thereof.

Embodiment seven. The release coating composition of any one of the previous embodiments, wherein the sulfonated polyester siloxane polymer is derived from 45 to 55 mole percent of the organic diol, wherein the organic diol is ethylene glycol, 1,6-hexylene glycol, 1,4-cyclohexane dimethanol, neopentyl glycol, or mixtures thereof.

Embodiment eight. The release coating composition of any one of the previous embodiments, wherein the organic diacid or diester is terephthalic acid, isophthalic acid, phthalic acid, maleic anhydride, dialkyl esters thereof, or mixtures thereof, wherein the organic diacid or diester each is selected in an amount of from 5 to 55 percent of the sulfonated polyester siloxane polymer.

Embodiment nine. The release coating composition of any one of the previous embodiments, wherein the sulfonated polyester siloxane polymer is comprised of 5 to 30 weight percent of the carbinol terminated polydimethylsiloxane or the carboxy terminated polydimethylsiloxane, wherein the carbinol terminated polydimethylsiloxane or the carboxy terminated polydimethylsiloxane is bis-(1,3-hydroxypropyl)-polydimethylsiloxane.

Embodiment ten. The release coating composition of any one of the previous embodiments, wherein the sulfonated polyester siloxane polymer has a number average molecular weight of from 2,000 grains per mole to 10,000 grams per mole, a weight average molecular w % eight of from 4,000 grams per mole to 25,000 grams per mole, and a polydispersity of from 1.8 to 10.

Embodiment eleven. The release coating composition of any one of the previous embodiments, as represented by the following chemically bonded random segments

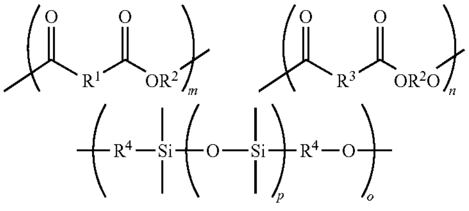

wherein the segments m, n and o represent the random units of the sulfonated polyester siloxane polymer and wherein the sum of in, n, and o is from about 10 to about 500; p represents the repeating segment of the polydimethylsiloxane and is from about 20 to about 150 units; $R^1$ is an arylene; $R^2$ is an alkylene, $R^3$ is an phenylenesulfonate, isophthalylene-5-sulfonate, terephthalylene-sulfonate, phthalylene-sulfonate, or naphthylene-sulfonate.

Embodiment twelve. The release coating composition of embodiment eleven, wherein $R^3$ is of the formula

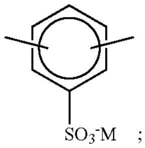 ; 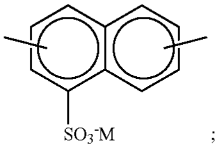 ;

wherein M is hydrogen, an alkali (1) metal of lithium, sodium, potassium, rubidium, or cesium and $R^4$ is ethylene, propylene or butylene.

Embodiment thirteen. The release coating composition of any one of the previous embodiments, wherein the sulfonated polyester siloxane polymer is poly(ethylene terephthalate)-co-(1,4-cyclohexane dimethylene terephthalate)-co-(ethylene isophthalate)-co-(1,4-cyclohexane dimethylene isophthalate)-co-(ethylene 5-sulfoisophthalate)-co-(1,4-cyclohexane dimethylene 5-sulfoisophthalate)-co-(polydimethylsiloxane propylene terephthalate)-co-(polydimethylsiloxane propylene isophthalate)-co-(polydimethylsiloxane propylene 5-sulfoisophthalate) or poly(ethylene sebacate)-co-(2,2-dimethylpropylene sebacate)-co-(ethylene isophthalate)-co-(2,2-dimethylpropylene isophthalate)-co-(ethylene 5-sulfoisophthalate)-co-(2,2-dimethylpropylene 5-sulfoisophthalate)-co-(polydimethylsiloxane propylene sebacate)-co-(polydimethylsiloxane propylene isophthalate)-co-(polydimethylsiloxane propylene 5-sulfoisophthalate).

Embodiment fourteen. The release coating composition of any one of the previous embodiments, wherein the at least one organic diacid monomer or at least one diester monomer is selected from at least one of terephthalic acid, dimethyl terephthalate, and combinations thereof.

Embodiment fifteen. The release coating composition of any one of the previous embodiments, wherein the water-soluble or water-dispersible second polymer is selected from at least one of acrylate-based resins, sulfonated polyester-based resins, and combinations thereof.

Embodiment sixteen. The release coating composition of any one of the previous embodiments, wherein the multifunctional compound comprises at least one of melamine, diazine, urea, cyclic ethylene urea, cyclic propylene urea, thiourea, cyclic ethylene thiourea, alkyl melamines, aryl melamines, benzo guanamines, guanamines, alkyl guanamines, aryl guanamines with an aldehyde, and combinations thereof.

Embodiment seventeen. The release coating composition of any one of the previous embodiments, wherein the multifunctional compound is present at from 0.1 to 2 percent solids by weight based on the weight of the release coating composition.

Embodiment eighteen. The release coating composition of any one of the previous embodiments, wherein the composition is aqueous.

Embodiment nineteen. The release coating composition of any one of the previous embodiments, further comprising an additive.

Embodiment twenty. The release coating composition of embodiment nineteen, wherein the additive is selected from at least one of silica, polymethyl methacrylate, an anti-static agent or combinations thereof.

Embodiment twenty-one. The release coating composition of any one of the previous embodiments, comprising less than 10 wt % of the multifunctional compound versus the sulfonated polyester siloxane polymer.

Embodiment twenty-two. The release coating composition of any one of the previous embodiments, comprising 1 to 50 wt % of the water-soluble or water-dispersible second polymer versus the sulfonated polyester siloxane polymer.

Embodiment twenty-three. The release coating composition of any one of the previous embodiments, wherein multifunctional compound comprises at least one of an acid catalyzed multifunctional compound, a thermally activated multifunctional compound, and combinations thereof.

Embodiment twenty-four. A coated substrate comprising:

A first layer disposed on a polyester substrate, wherein the first layer is a cured product of the release coating composition of any one of the previous embodiments.

Embodiment twenty-five. The coated substrate of embodiment twenty-four, wherein the polyester is biaxially oriented.

Embodiment twenty-six. The coated substrate of any one of embodiments twenty-four to twenty-five, wherein the thickness of the layer is 50 nm to 0.5 micron.

Embodiment twenty-seven. The coated substrate of any one of embodiments twenty-four to twenty-six, wherein at least a portion of the layer interpenetrates the polyester substrate.

Embodiment twenty-eight. The coated substrate of any one of embodiments twenty-four to twenty-seven, wherein the polyester substrate comprises at least one of polyethylene terephthalate, polyethylene naphthalate, polylactic acid, PETG, and blends thereof.

Embodiment twenty-nine. The coated substrate of any one of embodiments twenty-four to twenty-eight, further comprising a second layer disposed on the first layer opposite the polyester substrate.

Embodiment thirty. The coated substrate of any one of embodiments twenty-four to twenty-nine, further comprising a third layer disposed on polyester substrate opposite the first layer.

Embodiment thirty-one. A method of making a release coated article, the method comprising:

coating a substrate with the coating composition according to any one of embodiments one to twenty-two to form a coated article, and drawing the substrate in at least one of the longitudinal or machine direction.

Embodiment thirty-two. The method of embodiment thirty-one, wherein the substrate is drawn prior to coating the substrate.

Embodiment thirty-three. The method of any one of embodiments thirty-one to thirty-two wherein the coated article is drawn.

Embodiment thirty-four. The method of any one of embodiments thirty-one to thirty-three, further comprising heating the coated article to activate the curing system.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

The following abbreviations are used herein: cm=centimeters, g=grams, psig=pound-force per square inch, kPa=kilopascal, and wt=weight.

TABLE 1

| Materials List | | |
|---|---|---|
| DESIGNATION | DESCRIPTION | SOURCE |
| MDMS | Carbinol modified poly(dimethyl siloxane) obatined under the product number KF6003 | Shin-Etsu Chemical, Tokyo, Japan |
| EG | Ethylene glycol | ME Global, Columbia Heights MN, USA |
| DMT | Dimethyl terephthalate | Eastman, Kingsport, TN, USA |
| DMI | Dimethyl isophthalate | Vertellus, Middlesbrough UK |
| DMSSIP | Dimethyl 5-sodium sulfoisophthalate | Richman Chemical, Lower Gwynedd, PA, USA |
| NPG | Neopentyl glycol | Chempoint, Bellevue, WA, USA |
| TBT | Tetra-n-butyl titanate | Mytech Specialty Chemicals, Gaffney, SC, USA |
| Sodium acetate | sodium acetate | Alfa Aesar, Haverhill, MA, USA |
| MEK | Methyl ethyl ketone | Fisher Scientific, Hampton, NH, USA |
| D607 | Nonionic wetting agentobtained under the trade designation DYNOL 607 | Evonik Industries, Essen, Germany |
| E1000D | Sulfopolyester obtained under the trade designation EASTEK 1000D | Eastman Chemical Company, Kingsport, TN, USA |
| C327 | Methylated high imino melamine crosslinker obtained under the trade designation CYMEL 327 | Palmer Holland, North Olmsted, OH, USA |
| C4045 | Amine block p-toluene sulfonic acid catalyst obtained under the trade designation CYCAT 4045 | Palmer Holland, North Olmsted, OH, USA |
| Polyester substrate | The polyester substrate was extruded using a twin-screw extruder under vacuum from PET pellets | Nan Ya Plastics Corporation (Wharton, TX, USA) |

Test Methods

Measurement of Release

Film samples were cut into 1 inch wide×12 inch long (2.54 centimeters (cm)×30.5 cm) strips of film. A strip was adhered to a glass substrate (8 inch L×2 inch W×0.25 inch T (20.3 cm L×5.1 cm W×0.6 cm T)) using double-sided tape (available at under the trade designation "3M SCOTCH CELLOPHANE FILM TAPE 610 tape from 3M Co., Maplewood, MN). A piece of single sided tape (3M Co. #396, Maplewood, MN, USA) was applied directly to the coated film surface and laminated with a hand roller resulting in the following construction glass/double sided tape/polyester substrate/release coating/610 tape. Peel force of the tape from the release coating was measured immediately after application using an Imass SP-2100 (Accord, MA, USA) equipped with a MB-25 load cell. Averaging over 5 seconds was performed after a 1 second delay at 12 inch/minute (30.48 cm/minute).

Re-Adhesion to Cleaned Glass Plate

Release samples (glass/double sided tape/polyester substrate/release coating/610 tape) were prepared and dwelled at 72° F. (22.2° C.) and 50% relative humidity for 72 hours. The tape was then removed from the release coating and immediately applied to a cleaned (by rinsing with hexanes and isopropyl alcohol (IPA)) glass substrate. Peel force was measured immediately after application using an Imass SP-2100 equipped with a MB-25 load cell. Averaging over 5 seconds was performed after a 1 second delay at 12 inch/minute (30.48 cm/minute). Reported values are averages and standard deviations of at least 4 measurements.

Formulations

Formulation 1

The synthesis of the segmented copolyester was carried out in two consecutive steps in a stainless steel vessel (8 Liters (L)) equipped with a multistage distillation column. Ethylene glycol (1890 grams (g)), neopentyl glycol (406 g), dimethyl terephthalate (1367 g), dimethyl isophthalate (1367 g), dimethyl 5-sodium sulfoisophthalate (266 g), carbinol-modified poly(dimethyl siloxane) (562 g), sodium acetate (1.2 g), and tetrabutyl titanate (0.60 g) were charged to the kettle under ambient conditions. After loading, the kettle was sealed and placed under 20 pounds per square inch gage (psig) of nitrogen pressure. The batch was then heated to 480° F. (248.9° C.) and the transesterification step was allowed to proceed. Conversion was monitored by weight of methanol collected as distillate. After complete conversion of ester groups (as determined by theoretical yield of methanol) the pressure was slowly vented. The polymerization step was then initiated by gradual application of vacuum to the reaction kettle. The kettle was then heated to 540° F. (282.2° C.). Polymerization was monitored by power draw to the kettle agitator. At endpoint, vacuum was removed by nitrogen purge, and the batch was drained from the bottom of the kettle under minimal positive nitrogen pressure (up to 5 psig (34 kPa)) into cooling trays. After cooling, the resin was ground up for handling and dispersion. The collected product was glassy and an opaque white at room temperature.

Dispersion of the sulfonated polyester was conducted under heat. The polymerization product was charged to a (tared) round bottom flask. Deionized water and methyl ethyl ketone (MEK) (4:1 by weight) were added to the flask. The mass of aqueous solution added to the flask was calculated to be five times that of the mass of polyester. This mass of liquid lead to a 20 weight percent (wt %) solids aqueous solution after stripping of organic solvent. The flask was immersed in an oil bath set at 90° C. and the solution was refluxed until all of the polyester solids disappeared and the dispersion turned an opaque white. At this point, the condenser was replaced with a distillation head and the temperature of the oil bath was increased to 105° C. to begin removal of the organic phase. Progress of the stripping process was monitored by the overheads temperature. The temperature of the oil bath was incrementally increased until the overheads temperature reached 100° C. The solution was weighed and (if needed) deionized water was added to the dispersion to bring the solids content to 20% by weight.

Formulation 2

To a stainless steel vessel (8 Liters (L)) equipped with a multistage distillation column, ethylene glycol (1831 g), neopentyl glycol (393 g), dimethyl terephthalate (1326 g), dimethyl isophthalate (1326 g), dimethyl 5-sodium sulfoisophthalate (258 g), carbinol-modified poly(dimethyl siloxane) (726 g), sodium acetate (1.16 g), and tetrabutyl titanate (0.58 g) were charged to the kettle under ambient conditions. The polymerization and dispersion of the product was conducted under identical conditions to Formulation 1.

EXAMPLES

Comparative Example 1 (CE-1)

In a Karo batch orienter (Brickner Maschinenbau GmbH & Co., Siegsdorf, Germany), uncoated PET was cut into 4 inch×4 inch (10.2 cm×10.2 cm) pieces and oriented at 100° C. to a draw ratio of 3.5×3.5 at 50%/second (constant speed). Heat set samples were heated at 225° C. for 15 seconds after orientation to improve crystallinity.

Comparative Example 2 (CE-2)

To four grams of Formulation 1, four drops of a 10 wt % solution of DYNOL 607 in water was added to aid in surface wetting. The aqueous dispersion was coated onto 24 mil (0.61 millimeter (mm)) thick unoriented, amorphous PET. The PET surface was washed with isopropyl alcohol and dried in air prior to coating to remove contaminants. The dispersion was coated with an RS08 Mayer rod (RDS Specialties, Webster, NY, USA) and dried in air at 93° C. for two minutes. In a Karo batch orienter, the coated PET was cut into 4 inch×4 inch (10.2 cm×10.2 cm) pieces and oriented at 100° C. to a draw ratio of 3.5×3.5 at 50/a/second (constant speed) using a Karo batch orienter. Heat set samples were heated at 225° C. for 15 seconds after orientation to improve crystallinity.

Comparative Example 3 (CE-3)

One grams of aqueous dispersion of Formulation 1 was mixed with three grams of EASTEK 1000D. To this mixture, four drops of a 10 wt % solution of DYNOL 607 in water was added. EASTEK was added to improve film formation upon drying and is commonly used in sulfopolyester solutions as a film forming aid. The coating and orientation of underlying PET was identical to that of Comparative Example 2.

Comparative Example 4 (CE-4)

Two grams of aqueous dispersion of Formulation 1 was mixed with two grams of EASTEK 1000D. To this mixture, four drops of a 10 wt % solution of DYNOL 607 in water was added. The coating and orientation of underlying PET was identical to that of Comparative Example 2.

Comparative Example 5 (CE-5)

Three grams of aqueous dispersion of Formulation 1 was mixed with one gram of EASTEK 1000D. To this mixture, four drops of a 10 wt % solution of DYNOL 607 in water was added. The coating and orientation of underlying PET was identical to that of Comparative Example 2.

Comparative Example 6 (CE-6)

Four grams of aqueous dispersion of Formulation 1 was mixed with one gram of EASTEK 1000D. To this mixture, four drops of a 10 wt % solution of DYNOL 607 in water was added. The coating and orientation of underlying PET was identical to that of Comparative Example 2.

Comparative Example 7 (CE-7)

Five grams of aqueous dispersion of Formulation 1 was mixed with one gram of EASTEK 1000D. To this mixture, four drops of a 10 wt % solution of DYNOL 607 in water was added. The coating and orientation of underlying PET was identical to that of Comparative Example 2.

Comparative Example 8 (CE-8)

One gram of the aqueous dispersion of Formulation 2 was mixed with three grams of EASTEK 1000D. EASTEK was necessary to improve film formation upon drying and is commonly used in sulfopolyester solutions as a film forming aid. To five grams of solution, four drops of a 0.1 wt % solution of DYNOL 607 in water was added to aid in surface wetting. The aqueous dispersion was coated onto 24 mil (0.61 mm) thick unoriented, amorphous PET. The PET was surface was washed with isopropyl alcohol and dried in air prior to coating to remove contaminants. The dispersion was coated with an RS08 Mayer rod and dried in air at 93° C. for two minutes. In a Karo batch orienter, the coated PET was cut into 4 inch×4 inch (10.2 cm×10.2 cm) pieces and oriented at 100° C. to a draw ratio of 3.5×3.5 at 50%/second (constant speed). Heat set samples were heated at 225° C. for 15 seconds after orientation to improve crystallinity.

Comparative Example 9 (CE-9)

Two grams of the aqueous dispersion of Formulation 2 was mixed with two grams of EASTEK 1000D. To this mixture, four drops of a 10 wt % solution of DYNOL 607 in water was added. The coating and orientation of underlying PET was identical to that of Comparative Example 8.

Comparative Example 10 (CE-10)

Three grams of the aqueous dispersion of Formulation 2 was mixed with one gram of EASTEK 1000D. To this mixture, four drops of a 10 wt % solution of DYNOL 607 in water was added. The coating and orientation of underlying PET was identical to that of Comparative Example 8.

Example 11 (EX-11)

To five grams of a dispersion comprising 33% by mass of EASTEK 1000D and 67% by mass of Formulation 2, 0.1 g a 10 wt % solution of DYNOL 607 in water, 0.05 g CYMEL 327 at 20% solids in water, and 0.018 g CYCAT 4045 at 1% solids in water were added. The aqueous dispersion was coated onto 24 mil (0.61 millimeter (mm)) thick unoriented, amorphous PET. The PET surface was washed with isopropyl alcohol and dried in air prior to coating to remove contaminants. The dispersion was coated with an RS08 Mayer rod and dried in air at 93° C. for two minutes. In a Karo batch orienter, the coated PET was cut into 4 inch ×4 inch (10.2 cm ×10.2 cm) pieces and oriented at 100° C. to a draw ratio of 3.5 ×3.5 at 50%/second (constant speed) using a Karo batch orienter. Heat set samples were heated at 225° C. for 15 seconds after orientation to improve crystallinity.

Example 12 (EX-12)

To five grams of a dispersion comprising 33% by mass of EASTEK 1000D and 67% by mass of Formulation 2, 0.1 g a 10 wt % solution of DYNOL 607 in water, 0.125 g CYMEL327 at 20% solids in water, and 0.045 g CYCAT 4045 at 1% solids in water were added. The coating and orientation of underlying PET was identical to that of Example 11.

Example 13 (EX-13)

To five grams of a dispersion comprising 33% by mass of EASTEK 1000D and 67% by mass of Formulation 2, 0.1 g a 10 wt % solution of DYNOL 607 in water, 0.25 g CYMEL 327 at 20% solids in water, and 0.09 g CYCAT 4045 at 1% solids in water were added. The coating and orientation of underlying PET was identical to that of Example 11.

The various samples were then measured for release from glass. Shown in Table 2 below is the average peel force, at initial, and after re-adhesion to a cleaned glass plate. Also shown in Table 2 is the performance of heat set samples (heated at 225° C. for 15 seconds) and the performance of the heat set samples after aging for 4 days at 72° F./50% relative humidity.

Shown in Table 2 is the peel force for the above listed samples before and after heat set and aging (wherein the heat set samples were aged for 4 days at 72° F./50% relative humidity before testing. Reported values with standard deviations are averages of at least 4 measurements.

TABLE 2

| | Peel Force g/in | | |
|---|---|---|---|
| SAMPLE | Before Heat Set | After Heat Set | Aged |
| CE-1 | 867.3 +/− 27.6 | | |
| CE-2 | 96.5 +/− 11.0 | | |
| CE-3 | 246.9 +/− 9.8 | 196.1 +/− 19.3 | |
| CE-4 | 181.9 +/− 22.4 | 23.6 +/− 4.7 | |
| CE-5 | 83.1 +/− 37.0 | 25.2 +/− 5.5 | |
| CE-6 | 96.9 +/− 9.8 | 15.4 +/− 0.4 | |
| CE-7 | | 15.0 +/− 2.4 | |
| CE-8 | 285.4 +/− 20.5 | 86.6 +/− 14.6 | 843.8 |
| CE-9 | 174.4 +/− 17.3 | 16.5 +/− 7.1 | |
| CE-10 | 103.1 +/− 7.5 | 25.2 +/− 6.7 | |
| EX-11 | | 38.2 | 340.9 |
| EX-12 | | 43.4 | 266.8 |
| EX-13 | | 44.9 | 67.3 |

Silicone is known to transfer from a release liner to the various surfaces it comes in contact with. In the Re-adhesion test described above, the tape that was initially adhered to the release coating was removed and adhered to a glass substrate to investigate how the peel strength of the tape removed from the glass substrate changes. This value can be compared to the same tape that had no contact with a release liner, which had a peel force on the glass substrate of 1770 g/in. Shown in Table 3 below is the peel force of the tape after contact with the various release liners indicated in the Re-adhesion test. Reported values with standard deviations are averages of at least 4 measurements.

TABLE 3

| SAMPLE | PEEL FORCE, g/in |
|---|---|
| CE-1 | 451.6 +/− 41.7 |
| CE-3 | 344.5 +/− 5.5 |
| CE-4 | 309.1 +/− 21.3 |
| CE-5 | 309.1 +/− 14.6 |
| EX-11 | 856.65 |
| EX-12 | 871.7 |
| EX-13 | 808.25 |

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will prevail.

What is claimed is:

1. A release coating composition comprising:

(i) a sulfonated polyester siloxane polymer derived from:

(a) at least one organic diol monomer;

(b) at least one organic diacid monomer, at least one diester monomer or mixtures thereof;

(c) at least one carbinol terminated polydimethylsiloxane, at least one carboxy terminated polydimethylsiloxane, or mixtures thereof; and (d) at least one ion salt of a sulfonate difunctional monomer;

(ii) a water-soluble or water-dispersible second polymer; and (iii) a thermally activated curing system comprising a multifunctional compound wherein the multifunctional compound comprises at least one of melamine, diazine, urea, cyclic ethylene urea, cyclic propylene urea, thiourea, cyclic ethylene thiourea, alkyl melamines, aryl melamines, benzo guanamines, guanamines, alkyl guanamines, aryl guanamines with an aldehyde, and combinations thereof and wherein the release coating composition is aqueous.

2. The release coating composition of claim 1, wherein the sulfonated polyester siloxane polymer is represented by the following randomly chemically attached segments:

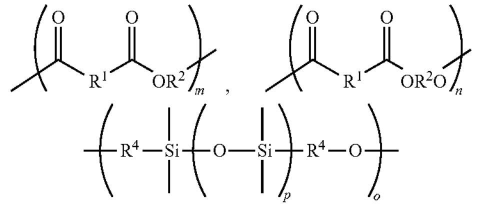

wherein the segments m, n and o represent the random units of the sulfonated polyester siloxane polymer, and wherein the sum of m, n, and o is from about 10 to about 500; p is from about 20 to about 150 units; $R^1$ is an arylene; $R^2$ is an alkylene; $R^3$ is an alkali arylene sulfonate or an alkali alkylene-sulfonate, and $R^4$ is an alkylene.

3. The release coating composition of claim 2, wherein $R^3$ is an alkali arylenesulfonate of the formulae

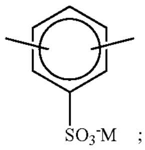 ; 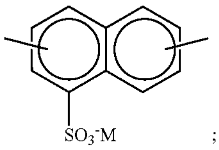 ;

or wherein M is selected from at least one of hydrogen, lithium, sodium, potassium, rubidium, or cesium.

4. The release coating composition of claim 2, wherein $R^3$ is an phenylenesulfonate, isophthalylene-5-sulfonate, terephthalylene-sulfonate, phthalylene-sulfonate, naphthylene-sulfonate, or is of the formula

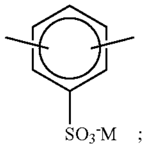 ; 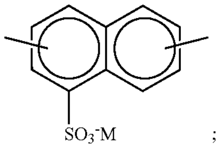 ;

wherein M is hydrogen, an alkali (I) metal of lithium, sodium, potassium, rubidium, or cesium; and $R^4$ is ethylene, propylene or butylene.

5. The release coating composition of claim 1, wherein the at least one ion salt of the sulfonate difunctional monomer comprises hydrogen, sodium, potassium, cesium, or rubidium salt of dimethyl-5-sulfo-isophthalate, 4-sulfo-phthalic acid, sulfo-terephthalic acid, dimethyl-sulfo-terephthalate, dialkyl-sulfo-terephthalate or combinations thereof.

6. The release coating composition of claim 1, wherein the at least one organic diol monomer is ethylene glycol, 1,6-hexylene glycol, 1,4-cyclohexane dimethanol, neopentyl glycol, or mixtures thereof.

7. The release coating composition of claim 6, wherein the sulfonated polyester siloxane polymer is derived from 45 to 55 mole percent of the at least one organic diol monomer.

8. The release coating composition of claim 1, wherein the at least one organic diacid monomer or the at least one diester monomer is terephthalic acid, isophthalic acid, phthalic acid, maleic anhydride, dialkyl esters thereof, or mixtures thereof, and wherein the at least one organic diacid monomer or the at least one diester monomer each is selected in an amount of from 5 to 55 percent of the sulfonated polyester siloxane polymer.

9. The release coating composition of claim 1, wherein the sulfonated polyester siloxane polymer is comprised of 5 to 30 weight percent of the at least one carbinol terminated polydimethylsiloxane or the at least one carboxy terminated polydimethylsiloxane.

10. The release coating composition of claim 1, wherein the sulfonated polyester siloxane polymer is (i) poly(ethylene terephthalate)-co-(1,4-cyclohexane dimethylene terephthalate)-co-(ethylene dimethylene isophthalate)-co-(ethylene 5-isophthalate)-co-(1,4-cyclohexane sulfoisophthalate)-co-(1,4-cyclohexane dimethylene 5-sulfoisophthalate)-co-(polydimethylsiloxane propylene terephthalate)-co-(polydimethylsiloxane propylene isophthalate)-co-(polydimethylsiloxane propylene 5-sulfoisophthalate) or (ii) poly(ethylene sebacate)-co-(2,2-dimethylpropylene sebacate)-co-(ethylene isophthalate)-co-(2,2-dimethylpropylene isophthalate)-co-(ethylene 5-sulfoisophthalate)-co-( 2,2-dimethylpropylene 5-sulfoisophthalate)-co-(polydimethylsiloxane propylene sebacate)-co-(polydimethylsiloxane propylene isophthalate)-co-(polydimethylsiloxane propylene 5-sulfoisophthalate).

11. The release coating composition of claim 1, wherein the at least one organic diacid monomer or the at least one diester monomer is selected from at least one of terephthalic acid, dimethyl terephthalate, and combinations thereof.

12. The release coating composition of claim 1, wherein the multifunctional compound is present from 0.1 to 2 percent solids by weight based on the solids weight of the release coating composition.

13. The release coating composition of claim 1, wherein the at least one organic diol monomer is ethylene glycol, 1,6-hexylene glycol, 1,4-cyclohexane dimethanol, neopentyl glycol, or mixtures thereof;

the at least one organic diacid monomer or the at least one diester monomer is terephthalic acid, isophthalic acid, phthalic acid, maleic anhydride, dialkyl esters thereof, or mixtures thereof; and wherein the at least one ion salt of the sulfonate difunctional monomer comprises hydrogen, sodium, potassium, cesium, or rubidium salt of dimethyl-5-sulfo-isophthalate, 4-sulfo-phthalic acid, sulfo-terephthalic acid, dimethyl-sulfo-terephthalate, dialkyl-sulfo-terephthalate or combinations thereof.

14. The release coating composition of claim 1, wherein the multifunctional compound comprises at least one of melamine, diazine, alkyl melamines, aryl melamines, benzo guanamines, guanamines, alkyl guanamines, aryl guanamines with an aldehyde, and combinations thereof.

15. The release coating composition of claim 1, wherein the release coating composition comprises at least 1 to at most 95% by weight of the water-soluble or water-dispersible second polymer based on the weight of the sulfonated polyester siloxane polymer and at least 0.1 to at most 20% by weight of the multifunctional compound versus the weight of the sulfonated polyester siloxane polymer.

16. A coated substrate comprising:

A first layer disposed on a polyester substrate, wherein the first layer is a cured product of the release coating composition of claim 1.

17. The coated substrate of claim 16, wherein a thickness of the first layer is 50 nm to 0.5 micron.

18. The coated substrate of claim 16, wherein at least a portion of the first layer interpenetrates the polyester substrate.

19. A method of making a release coated article, the method comprising:

coating a substrate with the release coating composition according to claim 1 to form a coated article, and drawing the substrate in at least one of the longitudinal or machine direction and optionally wherein the coated article is drawn.

20. The method of claim 19, wherein the substrate is drawn prior to coating the substrate.

* * * * *